United States Patent [19]

Barlow

[11] 4,401,363
[45] Aug. 30, 1983

[54] OPTICAL WAVEGUIDE AND METHOD OF PROPAGATING WAVES THEREIN

[75] Inventor: Harold E. M. Barlow, Epsom, England

[73] Assignee: National Research Development Corporation, London, England

[21] Appl. No.: 192,035

[22] Filed: Sep. 29, 1980

[30] Foreign Application Priority Data

Oct. 15, 1979 [GB] United Kingdom ............... 7935744

[51] Int. Cl.³ .................. G02B 5/172; G02B 5/176
[52] U.S. Cl. .............................. 350/96.3; 350/96.33; 350/96.15; 250/227
[58] Field of Search ............... 350/96.29, 96.3, 96.31, 350/96.32, 96.34, 96.15; 250/227

[56] References Cited

U.S. PATENT DOCUMENTS

| | | | |
|---|---|---|---|
| 3,386,043 | 5/1968 | Marcatili et al. | 350/96.3 X |
| 3,877,912 | 4/1975 | Shiraishi et al. | 350/96.33 X |
| 3,973,828 | 8/1976 | Onoda et al. | 350/96.32 |

FOREIGN PATENT DOCUMENTS

| | | |
|---|---|---|
| 764737 | 1/1957 | United Kingdom . |
| 1339599 | 12/1973 | United Kingdom . |
| 1362757 | 8/1974 | United Kingdom . |
| 1434977 | 5/1976 | United Kingdom . |
| 1475478 | 6/1977 | United Kingdom . |
| 1496324 | 12/1977 | United Kingdom . |
| 1543242 | 3/1979 | United Kingdom . |
| 2021804A | 12/1979 | United Kingdom . |
| 1569132 | 6/1980 | United Kingdom . |
| 2067781A | 7/1981 | United Kingdom . |

OTHER PUBLICATIONS

Carome et al, "Optical Fiber Acoustic Sensor", Conference: Fiberoptics Advances in Research and Development, Kingston, R.I., U.S.A., 19-23 Jun. 1978; pp. 657-677.

"Tube Waveguide for Optical Transmission", by D. Marcuse and W. L. Mammel, The Bell System Technical Journal, vol. 52, No. 3, Mar. 1973, pp. 423-435.

"Cutoff Conditions in Three-Layer Cylindrical Dielectric Waveguides", by A. Safaai-Jazi and G. L. Yip, IEEE Transactions on Microwave Theory and Techniques, vol. MTT-26, No. 11, Nov. 1978, pp. 898-903.

Bell System Technical Journal, May 1962, p. 1031, Abstract of Rowe/Warters article, "Transmission in Multiple Waveguide with Random Imperfections".

"Characteristics of a Doubly Clad Optical Fiber with a Low-Index Inner Cladding", Kawakami, et al., IEEE Journal of Quantum Electronics, Dec. 1974, pp. 879-887.

*Primary Examiner*—Marvin L Nussbaum
*Attorney, Agent, or Firm*—Cushman, Darby & Cushman

[57] ABSTRACT

Conventional optical waveguides are of very small diameter making handling and coupling difficult. Also the $HE_{11}$ mode is used and this can give rise to contamination where inhomogeneities arise in the waveguide. The waveguide of the present invention has a tube of higher permittivity optical material, with a core of lower permittivity optical material and cladding again of lower permittivity material. The critical dimension is the thickness of the tube and the tube diameter can therefore be made very much larger than that of the conventional optical waveguide. Such a waveguide when properly excited will support the $HE_{11}$ wave as a single mode or alternatively the $TE_{01}$ mode as a pure wave. Methods of launching and propagating these modes are described.

15 Claims, 5 Drawing Figures

OPTICAL WAVEGUIDE AND METHOD OF PROPAGATING WAVES THEREIN

The present invention relates to the propagation of optical frequencies of electromagnetic waves individually identified as modes and to optical waveguides for supporting these modes.

The mode conventionally used in optical waveguides for telecommunication purposes is the hybrid $HE_{11}$ mode since this mode is easy to launch and is the "natural" mode for the structure employed in that the transverse electric field component follows approximately parallel lines across a transverse section of a circular optical waveguide. The optical waveguide used for the $HE_{11}$ mode consists of an elongated higher permittivity, that is higher refractive index, solid cylinder covered with lower permittivity, that is lower refractive index, cladding. Transmission occurs along the higher permittivity cylinder and electric and magnetic fields in the cladding are evanescent and decay quickly practically to zero radially in the cladding.

Since the $HE_{11}$ mode is a hybrid mode and can therefore be regarded as a "mixture" of transverse and longitudinal waves, all six components of magnetic and electric fields are present (that is the electric and magnetic fields each comprise three components, one radial, one circumferential and one longitudinal). As a result two different wave impedances arise, one which is the ratio of the radial electric field to the circumferential magnetic field and the other which is the ratio of the radial magnetic field to circumferential electric field, and further these impedances vary with radius, particularly at the high frequencies of optical waves. While the difference between these wave impedances and their variation with radius is not important for propagation through waveguides formed from axially homogeneous materials, it gives rise to contamination of the wave where there are any inhomogeneities, causing reflections, for example at connections to and from the waveguide. As a result dispersion is increased.

To prevent some resonant modes propagating in the $HE_{11}$ optical waveguide, the diameter of the waveguide is limited in size so as to cut off waves of higher order. In practice this means that the diameter of the waveguide has to be about $10^{-6}$ meters. Clearly it is very difficult to make a successful coupling from a light signal source to a waveguide of these dimensions and to extract signals from such a waveguide.

According to a first aspect of the present invention there there is provided a transmission system which includes means for generating periodically varying signals, an optical waveguide having a tubular wall capable of supporting propagation in all of the modes $HE_{11}$, $TE_{01}$ and $TM_{01}$, and means for handling waves in up to but not more than two of the said modes but not both the $TE_{01}$ and $TM_{01}$ modes. The optical waveguide includes a tube of a first solid optical material having a wall thickness equal to, or greater than, substantially half the maximum radial wavelength of the waves in the first optical material and is such that the phase-change of the waves within the tube wall and normal to the wall surfaces is sufficiently small to ensure that the electromagnetic fields inside and outside the tube walls, due to the said waves, are evanescent. The tube contains and is surrounded by a second solid optical material or materials, the first optical material being of higher permittivity than the second optical material or each of the second optical materials, and the first optical material and the second optical material or materials each having a specific dielectric conductivity of less than $10^{-4}$ mhos per meter.

The limit of $10^{-4}$ mhos per meter distinguishes optical material such as glass suitable for optical waveguides from other glasses, for example.

For any predetermined band of wavelengths of signals to be supported in the waveguide, the thickness of the tube wall must be approximately equal to, or greater than, substantially half the maximum wavelength of the said band and such that the signal phase-change within the tube wall and normal to the wall surfaces is sufficiently small to ensure that the electromagnetic fields due to the predetermined signals inside and outside the tube wall are evanescent.

A main advantage of the first aspect of the present invention is that the radii of the inner and outer surfaces of the tube wall, when the tube is circular in cross-section, may be much larger, for example fifty times as large as the diameter of a conventional waveguide, since the electrically resonant portion of the waveguide is the thickness of the tube wall (which may be relatively small) instead of the overall radius as in the conventional optical waveguide. A waveguide having these much larger overall dimensions is, of course, much easier to use, for example when being coupled to other waveguides or equipment. The ratio of the radius of the outer surface of the tube divided by the radius of the inner surface thereof may, for example, be a little greater than 1. However, if the fibre is small this ratio might rise to about 3 because the radius of the core can scarcely be less than $0.5 \times 10^{-6}$ m. and the thickness of the tube requires to be at least half a wavelength.

The thickness of the tube may be small compared with its inner radius so that as far as internal resonant modes are concerned the cut-off frequency for the tube as a guide is just below the carrier frequency of signals required to be transmitted and interference from lower frequencies is substantially removed.

As is explained below, it is advantageous to transmit along the waveguide of the first aspect of the invention in the $TE_{01}$ mode (or, less likely, the $TM_{01}$ mode) but a further advantage is that the waveguide is very adaptable and can be used to transmit in the conventional $HE_{11}$ or wave as a single mode with the advantage of size mentioned above. Thus in a situation where it is decided to install waveguide according to the invention transmission can be commenced using the $HE_{11}$ or mode but can then be changed to, or supplemented by, the $TE_{01}$ mode if it is decided later to take advantage of the special features of this latter mode.

Examination of the wave transmission characteristics of the waveguide according to the first aspect of the invention show that there are basically only two distinctive modes normally supported, even when the overall diameter of the fibre is some one hundred times larger than the thickness of the tube wall. One of these modes is the $TE_{01}$ wave which can, as explained below, be launched by oppositely directed electric field polarisations on the two sides of a diameter (although the $TM_{01}$ wave can also propagate if correctly launched), and the other mode is $HE_{11}$ mode generated when the applied electric field polarisation is the same over the whole diameter. Other modes of a spurious character are, in these circumstances, effectively cut off.

Means for launching waves in waveguides according to the first aspect of the invention or of transmssion systems according to the second aspect, may include a coherent light source generally either a laser or a light emitting diode (LED) adapted to direct first and second light beams either in phase opposition for the $TE_{01}$ mode, or in phase for the $HE_{11}$ or mode, towards first and second areas, respectively, of one end of the tube, the first and second areas being positioned diametrically opposite one another.

Means for receiving waves may include a light sensitive device positioned to receive first and second light beams either in phase opposition for the $TE_{01}$ mode, or in phase for the $HE_{11}$ or mode, from first and second areas, respectively, of one end of the tube, the first and second areas being positioned diametrically opposite one another.

According to a second aspect of the invention there is provided a method of transmitting signals comprising generating periodically varying signals, and launching electromagnetic waves corresponding to the signals in up to but not more than two of the modes $HE_{11}$, $TE_{01}$ and $TM_{01}$ but not both the $TE_{01}$ and $TM_{01}$ modes on a waveguide and deriving signals from waves propagating in the waveguide, the waveguide comprising a hollow tube capable of supporting all of the said modes, the tube being constituted by a first solid optical material having a wall thickness equal to or greater than, substantially half the maximum radial wavelength of the said waves in the first optical material, the tube being such that the phase-change of the waves within the tube wall and normal to the wall surfaces is sufficiently small to ensure that the electromagnetic fields inside and outside the tube walls, due to the said waves, are evanescent, the tube being filled with, and/or surrounded by a second solid or liquid optical material or materials, the first optical material being of higher permittivity than the second optical material or each of the second optical materials, and the first optical material and the second optical material or materials each having a specific dielectric conductivity of less than $10^{-4}$ mhos per meter.

Using the method of the second aspect of the invention, transmission in the waveguide may be in any of the following modes: $TE_{01}$, or $HE_{11}$. Two or more of these modes may be used at the same time in the same optical waveguide that is the same tube wall, but when launched by a transverse electric field the $TE_{01}$ and $HE_{11}$ modes are the most significant.

Since the $TE_{01}$ (and the $TM_{01}$) modes are pure transverse waves which can be defined in terms of only three field components: for example for the $TE_{01}$ mode, a single transverse electric component together with a transverse magnetic component and a longitudinal magnetic component, only a single wave impedance arises and this impedance is not radially dependent. Thus, some of the above mentioned problems of wave contamination which arise when the $HE_{11}$ mode is used, are substantially removed.

The $TE_{01}$ mode is also expected to have low attenuation. In metal waveguides, including coaxial metal waveguides, attenuation theoretically falls without limit with increasing frequency. This is because the electric field tends to "withdraw" from the waveguide walls and the loss in the dielectric within them is relatively negligible. In practice however with metal waveguides at very high frequencies of the order of 90 G.Hz attenuation tends to rise again due to irregularities of cross-section. It may be that the same type of effect will be observed with the $TE_{01}$ mode in a dielectric guide at optical frequencies. Attenuation is expected to be very small and similar to that for the $HE_{11}$ mode in the conventional optical waveguide.

As an alternative in batch aspects of the invention to a sharp discontinuity between a low-permittivity material outside the tube and the relatively high-permittivity tube material, a gradual radially-outward variation of permittivity from high to low may be used. Similarly when the tube is filled with low-permittivity material the graduation between the high-permittivity material forming the "tube" and the low-permittivity material forming the core may be gradual rather than discrete. In any case the spread of field into the material inside and outside the tube is small.

As a rule the permittivity of the relatively high-permittivity material is only about 10% greater than that of the relatively low-permittivity material.

For propagation in the wall of a tube of circular cross-section in any of the above modes the propagation constant $\gamma$ is given by:

$$-\gamma^2 = \omega^2\mu_o\epsilon_o\epsilon_{r1} + U_1^2$$
$$= \omega^2\mu_o\epsilon_o\epsilon_{r2} + U_2^2$$
$$= \omega^2\mu_o\epsilon_o\epsilon_{r3} + U_3^2 \qquad \text{equation 1}$$

where $\omega$ = the angular frequency of waves propagating,
$\mu_o$ = the permeability of free space,
$\epsilon_o$ = the permittivity of free space,
$\epsilon_{r1}$ = the permittivity of material inside the tube,
$\epsilon_{r2}$ = the permittivity of the material of the tube wall,
$\epsilon_{r3}$ = the permittivity of the material outside the tube,
and the variables $U_n = a_n - jb_n$
where
$n$ = 1, 2 and 3 corresponding to inside the tube, the tube wall, and outside the tube, respectively,
$a_n$ = attenuation constant normal to the tube axis,
$b_n$ = phase-change constant normal to the tube axis,
$j = \sqrt{-1}$ Since attenuation inside and outside the tube is high $$U_1 \underline{\Omega} \ a_1 \text{ and } U_3 \underline{\Omega} \ a_3$$

Since attenuation inside the tube wall is low $$U_2 \underline{\Omega} \ -jb_2$$

Also, if $\gamma = \alpha + j\beta$
where $\alpha$ and $\beta$ are the axial attenuation and phase-change constants, respectively
then $\gamma^2 = -\beta^2$ when $\alpha$ is relatively small, as in this case.

Employing the above approximations equation 1 can be re-written:

$$\beta^2 = \omega^2\mu_o\epsilon_o\epsilon_{r1} + a_1^2$$
$$= \omega^2\mu_o\epsilon_o\epsilon_{r2} - b_2^2$$
$$= \omega^2\mu_o\epsilon_o\epsilon_{r3} + a_3^2$$

and thus, if the material inside the tube has the same permittivity as that outside, that is $\epsilon_{r1} = \epsilon_{r3}$, $$\text{then } a_1^2 = a_3^2 = \omega^2\mu_o\epsilon_o(\epsilon_{r2} - \epsilon_{r1}) - b_2^2 \qquad \text{equation 2}$$

If the material inside the tube has a different permittivity to that outside, that is $\epsilon_{r1}$ is not equal to $\epsilon_{r3}$, $$\text{then } a_3^2 = \omega^2\mu_o\epsilon_o(\epsilon_{r2} - \epsilon_{r3}) - b_2^2$$

Thus the attenuation constant of radial propagation outside the tube wall depends on the radial phase-change $b_2$ within the tube. Since propagation outside the tube wall must be evanescent the radial attenuation constant must be high, preferably not less than $10^6$ nepers per meter.

In order to fulfil the condition that the tube wall thickness is at least equal to half a wavelength and so allow resonant modes to propagate:

$$b_2 \triangleq \frac{\pi}{\delta},  \quad\quad\quad\quad \text{equation 3}$$

where $\epsilon$ is the thickness of the tube wall. Equations 2 and 3 allow $a_1$ and $a_3$ to be calculated for values of $\epsilon$.

Certain embodiments of the invention will now be described by way of example with reference to the accompanying drawings, in which.

Figure 1:
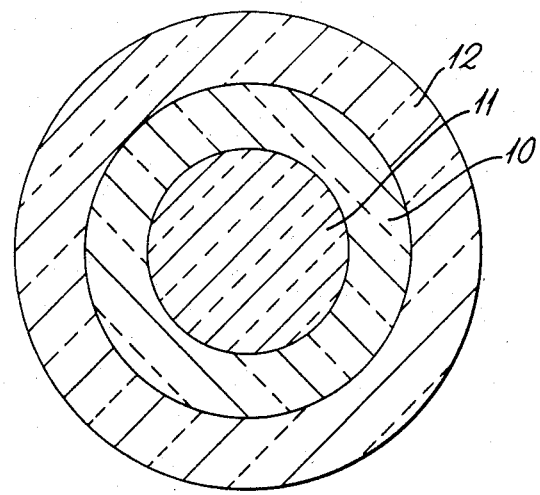
FIG. 1 is a cross-section of an optical waveguide according to the invention.

The optical waveguide shown in FIG. 1 which is suitable for propagating any of the $TE_{01}$, $TM_{01}$ and $HE_{11}$ modes comprises a relatively high permittivity dielectric tube 10 typically having a permittivity of 2.49 or thereabouts and a specific conductivity of $10^{-6}$ mhos per meter. The tube 10 is filled with dielectric material 11 having a lower permittivity of, for example 2.298 and specific conductivity equal to that of the tube 10. A cladding 12 is as a rule provided around the tube 10 and its permittivity is again lower than that of the tube 10. The filling 11 and the cladding 12 may be of the same material. Of course strengthening material and even armouring, may be provided around the cladding 12 and a cable may be made up which includes a number of optical fibres of the type shown in FIG. 1.

A study of field components at the interfaces between the tube 10 and the material 11, and the tube 10 and the cladding 12, shows that the $TE_{01}$ mode propagates where the permittivity of the tube material is higher than that of the material 11 and the cladding 12.

Figure 2:
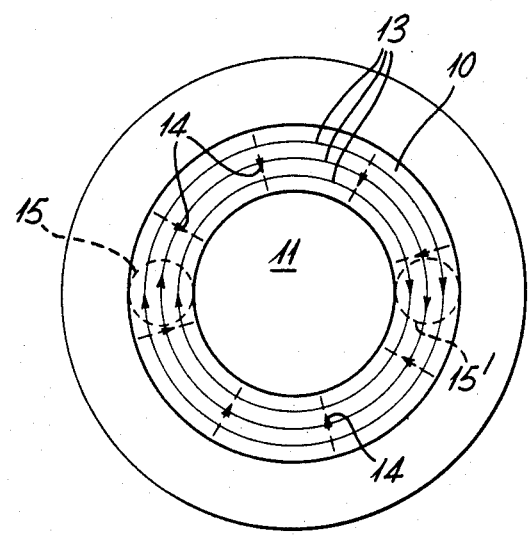
FIG. 2 is an end view illustrating fields of the $TE_{01}$ mode.

The $TE_{01}$ mode is illustrated in FIG. 2 where circles 13 indicate the transverse electric field and the magnetic field is illustrated by the radial lines 14. Only the radial component of the magnetic field is shown there being, of course, a longitudinal component so that the magnetic field forms a series of concentric loops, one end of one loop in a number of such series being shown in FIG. 2. Travelling down the tube 10, the loops extend for half a wavelength where the electric field reverses and loops in the opposite sense commence.

It will be seen that the electric field is in opposite directions on opposite sides of the longitudinal axis of the tube 10 and this is characteristic of the $TE_{01}$ mode. To launch that mode all that is required is that oppositely polarised coherent light is applied in the areas of the circles 15 and one way in which this can be achieved is to use the arrangement shown schematically in FIG. 3 where the tube 10 is seen in elevation.

A coherent light source 16, such as a laser or an LED projects component beams arising from the source, to the end of tube 10. In principle this can be seen as a beam splitter 17 (which may be a half silvered mirror) which allows a portion of the beam 18 to continue to the end of the tube 10 where it is incident in an area 15 also shown to the left of FIG. 2. At the same time another portion of the beam 19 passes by way of a mirror 20 to be incident in an area 15' (also shown in FIG. 2) of the end of the tube 10. In order to obtain the required 180° shift in phase, the path length of the beam portion 19, that is from the beam splitter 17 to the end of the tube 10 is adjusted so that it is half a wavelength longer, at the frequency of light from the source than the path of the beam portion 18. The requirements can be met in many known ways depending partly on whether a laser or LED is used as the source.

A similar arrangement can be used in reverse for receiving signals from the waveguide, the light source 16 being replaced by a light-sensitive device of one of the types used in known optical waveguide systems. Light which is out of phase when it leaves the areas 15 and 15' must be in phase when it reaches the light-sensitive device.

The waveguide shown in FIG. 1 can be constructed according to the ordinary techniques for optical waveguide construction except that larger dimensions are used and the higher permittivity dielectric material 10 is surrounded by the lower permittivity material 11, instead of vice versa and the lower permittivity material 12 is positioned over the material 11.

Figure 4:
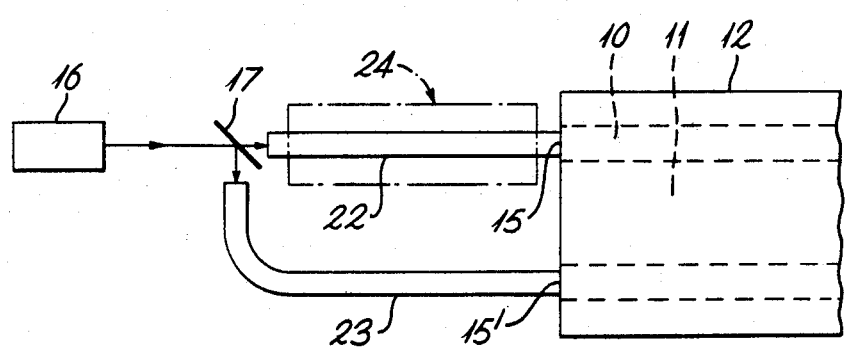

Another arrangement for launching the $TE_{01}$ mode is shown in FIG. 4 where light from the coherent light source 16 passes to optical fibres 22 and 23 by way of the beam splitter 17. The fibres direct the light on to the two areas 15 and 15'. It is known that the relative phase between light entering and leaving an optical fibre is dependent on longitudinal or radial strain applied to the fibre and in FIG. 4 such strain is applied by a strainer 24 either by stretching longitudinally or by radially compressing the fibre. The strainer 24 may be applied to the fibre 23 instead of the fibre 22.

In launching the $TE_{01}$ mode the strain in the fibre 22 is adjusted to give the required 180° phase difference in light arriving at the areas 15 and 15'.

This arrangement can also be used in reverse to receive signals from the waveguide if the source 16 is replaced by a photo-sensitive device for example of the type conventionally used with optical waveguides. Again there must be a phase difference of 180° in the lengths of the two paths.

Figure 5:
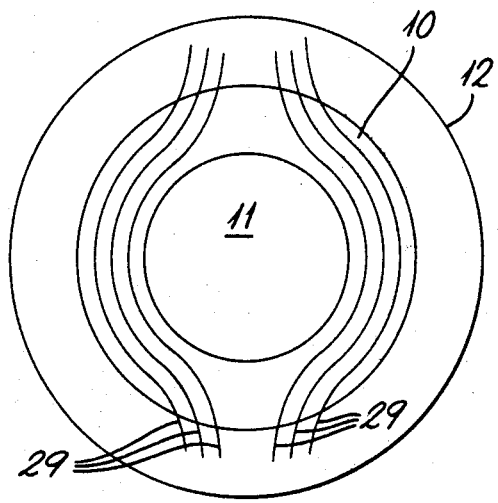
FIG. 5 is an end view illustrating fields of the $HE_{11}$ and $EH_{11}$ modes.

Any residual $HE_{11}$ mode in the guide is expected to be minimal after symetrically launching the $TE_{01}$ mode in the ways described, since for the $HE_{11}$ mode the electric field is in the same direction on both sides of the axis of the diameter of the tube 10 (see FIG. 5).

As has been mentioned the optical waveguide of FIG. 1 is also suitable for the propagation of the $HE_{11}$ mode. The transverse electric field component of this mode is shown in FIG. 5 where the continuous lines 29 represent electric field. Since these are hybrid modes longitudinal electric and magnetic field components also exist. In the $HE_{11}$ mode the transverse electric field is stronger than the magnetic field.

Figure 3:
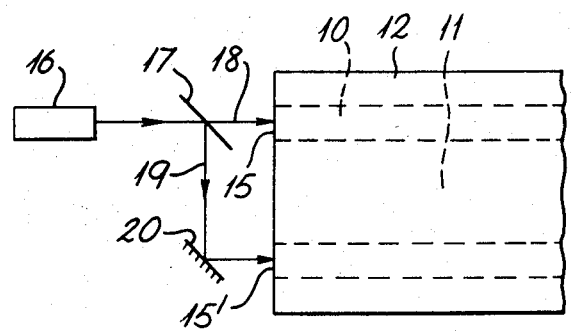
FIGS. 3 and 4 are schematic diagrams of means for launching the $TE_{01}$, $HE_{11}$ modes.

The $HE_{11}$ mode may be launched by the arrangement of FIG. 3 or 4 by adjusting the relative delay in the two incident light paths to ensure that the light is in phase at the areas 15 and 15'. Reception from the waveguide when the $HE_{11}$ mode is propagated may be carried out by using the arrangements of FIG. 3 or 4 in reverse and replacing the light source by a light-sensitive device. The light paths must be such that light in phase at the areas 15 and 15' is in phase when it reaches the light-sensitive device.

The waveguide of FIG. 1 can also be used to support waves in two or more of the three modes simultaneously, if arrangements are made for independently launching the modes required. A further higher permittivity tube can be provided around the cladding 12 with further low permittivity cladding around the further tube, thus providing two concentric optical waveguides. More waveguides can also be added in this way. Launching arrangements for each such waveguide are of course required to allow simultaneous propagation in one or more modes in each waveguide.

As has been mentioned the thickness of the tube 10 is slightly greater than half a wavelength of the wave being propagated, the half wavelength being measured in the material of the tube 10. It must also be sufficient to provide for an evanescent supporting field in the cladding material. If this condition is not fulfilled the waveguide formed by the tube 10 is below cutoff for the required $TE_{01}$ or $TM_{01}$, mode. There is no theoretical upper limit to tube thickness but the tube is preferably kept as thin as possible in order to prevent higher order resonant modes from propagating. Thus there are few restraints on dimensions for the waveguides shown in FIGS. 1 to 5. In a typical example for transmission at a frequency of $3 \times 10^{14}$ Hz the inner radius of the tube 10 might be $50 \times 10^{-6}$ meters and the outer radius $52.5 \times 10^{-6}$ meters. For $\epsilon_{r1} = \epsilon_{r3} = 2.298$ and $\epsilon_{r2} = 2.49$ a value of $a_1 = -a_3 = 2.45 \times 10^6$ nepers per meter is obtained using equations 2 and 3 given above. This value is ample to ensure that the electromagnetic fields in the material 11 and the cladding 12 are evanescent.

Since the radii of $50 \times 10^{-6}$ and $52.5 \times 10^{-6}$ meters are approximately 50 times greater than those conventionally used for fibres for the single-mode $HE_{11}$ wave it can be seen that problems of coupling to and from the optical waveguide are greatly eased. Using waveguides with diameters of this order, a connector can be made with a projection which fits into a recessed portion of the filling 11 for the tube 10. In this way the connector can "plug in" to the end of the glass fibre, and centering is readily achieved whether used for $TE_{01}$ or $HE_{11}$ mode transmission. The projection may be cone shaped and the recessed portion shaped to fit the cone in order to guide the two parts of the connector together and to ensure that the high permittivity tubes of the two parts of the connector are positioned coaxially facing one another after connection.

A further advantage of using the $TE_{01}$ mode is that in such connectors there is no current across the junction between the ends of the tubes carrying this mode.

Clearly optical waveguides and methods according to the invention will be extremely useful in communication systems as long distance links between coherent light sources already modulated with information signals and receivers for receiving such signals.

While specific examples of the invention have been given, it will be realised that the invention can be put into practice in many other ways. For example there are many other ways of launching the required wave in the guide in addition to those shown in FIGS. 3 and 5. Although the $TM_{01}$ mode may also be useful for optical fibre communication but it is much more difficult to launch in the comparatively thin walled tube envisaged.

I claim:

1. A transmission system comprising means for generating periodically varying signals, an optical waveguide having a tubular wall capable of supporting propagation in all of the modes $HE_{11}$, $TE_{01}$ and $TM_{01}$, and means for handling waves in up to but not more than two of the said modes but not both the $TE_{01}$ and $TM_{01}$ modes, on the waveguide, the optical waveguide comprising a tube of a first solid optical material having a wall thickness equal to, or greater than, substantially half the maximum radial wavelength of the said waves in the first optical material and such that the phase-change of the waves within the tube wall and normal to the wall surfaces is sufficiently small to ensure that the electromagnetic fields inside and outside the tube walls, due to the said waves, are evanescent, and the tube containing and being surrounded by a second solid optical material or materials, the first optical material being of higher permittivity than the second optical material or each of the second optical materials, and the first optical material and the second optical material or materials each having a specific dielectric conductivity of less than $10^{-4}$ mhos per meter.

2. A transmission system according to claim 1 wherein the attenuation constant radial to, but inside and outside, the tube wall is at least $10^6$ nepers per meter.

3. A transmission system according to claim 1 wherein the tube is circular in cross-section, the tube is filled with and surrounded by second optical materials having relative permittivities of $\epsilon_{r1}$ and $\epsilon_{r3}$, respectively, and the attenuation constants $a_1$ and $a_3$ radial to the tube in the material filling the tube and the material surrounding the tube, respectively, are each at least $10^6$ as calculated from $$a_1^2 = \omega^2 \mu_o \epsilon_o (\epsilon_{r2} - \epsilon_{r1}) - b_2^2,$$

and $$a_3^2 = \omega^2 \mu_o \epsilon_o (\epsilon_{r2} - \epsilon_{r3}) - b_2^2$$

where $\omega$ = the angular frequency of the predetermined signals,
$\mu_o$ = the permeability of free space,
$\epsilon_o$ = the permittivity of free space,
$\epsilon_{r2}$ = the permittivity of the first optical material,
$b_2 = (\pi/\delta)$, and
$\epsilon$ = the thickness of the tube in meters.

4. A transmission system according to claim 1 wherein the thickness of the tube wall is small relative to the minimum distance between the longitudinal axis of the tube and the inner surface of the tube wall.

5. A transmission system according to claim 4 wherein the tube is circular in cross-section and the ratio of the radius of the outer surface of the tube divided by the radius of the inner surface thereof is in the range: greater than 1 to not greater than 3.

6. A transmission system according to claim 1 wherein the first and second optical materials merge together gradually at the outside and/or the inside of the tube.

7. A transmission system according to claim 1 wherein the tube is surrounded by at least one further tube of relatively high permittivity optical material, the tubes being separated by optical material of relatively low permittivity material.

8. A transmission system according to claim 1 wherein one of the modes $TE_{01}$ and $TM_{01}$ is handled by said handling means which comprises launching means having a coherent light source adapted to direct first and second light beams in phase opposition towards first and second areas, respectively, of one end of the tube, the first and second areas being positioned diametrically opposite one another.

9. A transmission system according to claim 8 including beam splitter means for generating the first and second light beams from light from the said source, first and second optical fibres for directing the first and second light beams to the first and second areas, respectively, and means for straining the first or second fibres.

10. A transmission system according to claim 1 wherein one of the modes $TE_{01}$ and $TM_{01}$ is handled by said handling means which comprises receiving means having a light-sensitive device for receiving light from first and second areas of one end of the tube by way of first and second light paths, respectively, the first and second areas being positioned diametrically opposite one another and the first and second light paths being such that light in phase opposition in the first and second areas is in phase at the light-sensitive device.

11. A transmission system according to claim 10 wherein the first and second light paths comprise first and second optical fibres, respectively, and means for straining one of the fibres is provided.

12. A transmission system according to claim 1, wherein one of the modes $TE_{01}$ and $TM_{01}$ is handled by said handling means which comprises launching means having a coherent light source for directing first and second light beams in phase towards first and second areas, respectively, of one end of the tube, the first and second areas being positioned diametrically opposite one another.

13. A transmission system according to claim 1, wherein one of the modes $TE_{01}$ and $TM_{01}$ is handled by said handling means which comprises receiving means having a light-sensitive device for receiving light from first and second areas of one end of the tube by way of first and second light paths, respectively, the first and second areas being positioned diametrically opposite one another and the first and second light paths being such that light in phase in the first and second areas is in phase at the light-sensitive device.

14. A method of transmitting signals comprising generating periodically varying signals, and launching electromagnetic waves corresponding to the said signals in up to but not more than two of the modes $HE_{11}$, $TE_{01}$ and $TM_{01}$ but not both the $TE_{01}$ and $TM_{01}$ modes on a waveguide and deriving signals from waves propagating in the waveguide, the waveguide comprising a hollow tube capable of supporting all of the said modes, the tube being constituted by a first solid optical material having a wall thickness equal to or greater than, substantially half the maximum radial wavelength of the said waves in the first optical material, the tube being such that the variation of phase of the waves within the tube wall and normal to the wall surfaces is sufficiently small to ensure that the electromagnetic fields inside and outside the tube wall, due to the said waves, are evanescent, the tube containing and being surrounded by a second solid optical material or materials, the first optical material being of higher permittivity than the second optical material or each of the second optical materials, and the first optical material and the second optical material or materials each having a specific dielectric conductivity of less than $10^{-4}$ mhos per meter.

15. A method according to claim 14, including launching the waves in one of the $TE_{01}$ and $TM_{01}$ modes by transmitting first and second oppositely phased light signals to first and second areas, respectively, of an end of the tube, the areas being on opposite sides of the longitudinal axis of the tube.

* * * * *